United States Patent
Moyer et al.

(10) Patent No.: US 7,925,862 B2
(45) Date of Patent: *Apr. 12, 2011

(54) COPROCESSOR FORWARDING LOAD AND STORE INSTRUCTIONS WITH DISPLACEMENT TO MAIN PROCESSOR FOR CACHE COHERENT EXECUTION WHEN PROGRAM COUNTER VALUE FALLS WITHIN PREDETERMINED RANGES

(75) Inventors: William C. Moyer, Dripping Springs, TX (US); Kevin B. Traylor, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 157 days.

This patent is subject to a terminal disclaimer.

(21) Appl. No.: 11/426,630

(22) Filed: Jun. 27, 2006

(65) Prior Publication Data

US 2007/0300043 A1    Dec. 27, 2007

(51) Int. Cl.
 *G06F 9/312* (2006.01)
(52) U.S. Cl. ............................. 712/34; 711/141; 712/225
(58) Field of Classification Search .................... None
See application file for complete search history.

(56) References Cited

U.S. PATENT DOCUMENTS

| | | | |
|---|---|---|---|
| 4,870,614 A * | 9/1989 | Quatse ........................... 710/260 |
| 4,882,674 A | 11/1989 | Quint et al. |
| 4,979,102 A | 12/1990 | Tokuume |
| 5,053,949 A | 10/1991 | Allison et al. |
| 5,485,624 A | 1/1996 | Steinmetz et al. |
| 5,606,707 A | 2/1997 | Tomassi et al. |
| 5,727,180 A | 3/1998 | Davis et al. |
| 5,790,881 A | 8/1998 | Nguyen |
| 5,864,689 A | 1/1999 | Tran |
| 5,892,934 A | 4/1999 | Yard |
| 5,960,209 A | 9/1999 | Blount et al. |
| 6,002,881 A * | 12/1999 | York et al. ...................... 712/34 |
| 6,223,277 B1 | 4/2001 | Karguth |
| 6,233,593 B1 | 5/2001 | Slavin |
| 6,446,221 B1 * | 9/2002 | Jaggar et al. .................... 714/30 |
| 6,480,952 B2 * | 11/2002 | Gorishek et al. ............... 712/227 |
| 6,530,010 B1 | 3/2003 | Hung et al. |
| 6,865,663 B2 | 3/2005 | Barry |
| 6,938,132 B1 | 8/2005 | Joffe et al. |
| 2001/0052053 A1 | 12/2001 | Nemirovsky et al. |
| 2002/0138711 A1 * | 9/2002 | Bink et al. ....................... 712/34 |
| 2004/0030863 A1 | 2/2004 | Paver et al. |
| 2006/0010305 A1 | 1/2006 | Maeda et al. |

(Continued)

OTHER PUBLICATIONS

Arm; "ARM7TDMI-S, revision: r4p3, Technical Reference Manual"; 2001, pp. 5-1 thru 5-65.

(Continued)

*Primary Examiner* — Kenneth S Kim
(74) *Attorney, Agent, or Firm* — Susan C. Hill; Joanna G. Chiu

(57) ABSTRACT

A coprocessor (14) may be used to perform one or more specialized operations that can be off-loaded from a primary or general purpose processor (12). It is important to allow efficient communication and interfacing between the processor (12) and the coprocessor (14). In one embodiment, a coprocessor (14) generates and provides instructions (200, 220) to an instruction pipe (20) in the processor (12). Because the coprocessor (14) generated instructions are part of the standard instruction set of the processor (12), cache (70) coherency is easy to maintain. Also, circuitry (102) in coprocessor (14) may perform an operation on data while circuitry (106) in coprocessor (14) is concurrently generating processor instructions (200, 220).

15 Claims, 5 Drawing Sheets

| PROCESSOR 12 | COPROCESSOR 14 | |
|---|---|---|
| PROCESSOR INSTRUCTIONS EXECUTED BY PROCESSOR 12 | PROCESSOR INSTRUCTIONS GENERATED BY COPROCESSOR | COPROCESSOR OPERATIONS EXECUTED BY COPROCESSOR |
| INSTRUCTION FETCHED FROM MEMORY 54 { BRANCH TO SUBROUTINE AT A + 100<br>LOAD SAMPLE 1<br>LOAD SAMPLE 2<br>LOAD SAMPLE 3<br>LOAD SAMPLE 4<br>NOP OR STALL<br>STORE CALCULATED VALUE<br>⋮<br>RETURN FROM SUBROUTINE | LOAD SAMPLE 1<br>LOAD SAMPLE 2<br>LOAD SAMPLE 3<br>LOAD SAMPLE 4<br>NOP OR STALL<br>STORE CALCULATED VALUE<br>⋮<br>RETURN FROM SUBROUTINE | NOP<br>MAC (SAMPLE 1, COEFFICIENT 1)<br>MAC (SAMPLE 2, COEFFICIENT 2)<br>MAC (SAMPLE 3, COEFFICIENT 3)<br>MAC (SAMPLE 4, COEFFICIENT 4)<br>⋮ |

U.S. PATENT DOCUMENTS

2006/0218378 A1* 9/2006 Kudo ............................ 712/208

OTHER PUBLICATIONS

PCT/US07/67287 International Search Report and Written Opinion mailed Mar. 14, 2008.
Office Action mailed Oct. 11, 2007 in U.S. Appl. No. 11/426,628.
Office Action mailed Mar. 27, 2008 in U.S. Appl. No. 11/426,628.
Office Action mailed Aug. 8, 2008 in U.S. Appl. No. 11/426,628.
Examiner's Interview Summary mailed Oct. 29, 2008 in U.S. Appl. No. 11/426,628.
Office Action mailed Jan. 5, 2009 in U.S. Appl. No. 11/426,628.
Office Action mailed Apr. 29, 2009 in U.S. Appl. No. 11/426,628.
Restriction Requirement mailed Oct. 15, 2009 in U.S. Appl. No. 11/426,628.
Office Action mailed Dec. 17, 2009 in U.S. Appl. No. 11/426,628.
Pre-Appeal Conference Decision mailed Apr. 2, 2010 in U.S. Appl. No. 11/426,628.
Office Action mailed Nov. 14, 2007 in U.S. Appl. No. 11/426,633.
Office Action mailed Apr. 8, 2008 in U.S. Appl. No. 11/426,633.
Office Action mailed Oct. 10, 2008 in U.S. Appl. No. 11/426,633.
Office Action mailed Feb. 9, 2009 in U.S. Appl. No. 11/426,633.
Office Action mailed Jun. 18, 2009 in U.S. Appl. No. 11/426,633.
Office Action mailed Dec. 9, 2009 in U.S. Appl. No. 11/426,633.
Notice of Allowance mailed Feb. 17, 2010 in U.S. Appl. No. 11/426,633.
Office Action mailed May 5, 2010 in U.S. Appl. No. 11/426,628.
Office Action mailed Nov. 16, 2007 in U.S. Appl. No. 11/426,633.

* cited by examiner

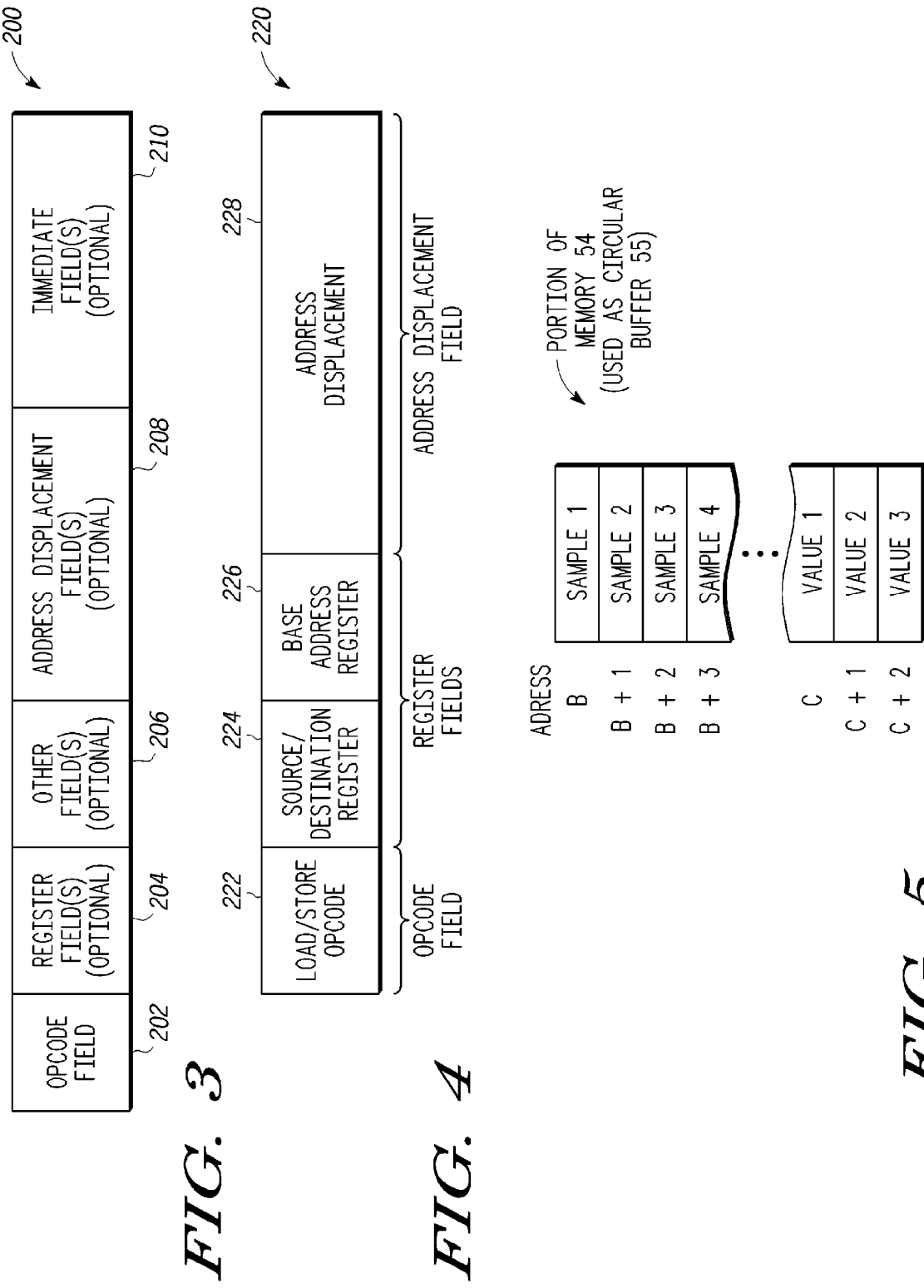

| WHEN ACCESSING SAMPLES IN CIRCULAR BUFFER 55, ADDRESS DISPLACEMENT 228 POINTS TO: | | |
|---|---|---|
| FOR 1ST ITERATION | FOR 2ND ITERATION | FOR 3RD ITERATION |
| SAMPLE 1 | SAMPLE 2 | SAMPLE 3 |
| SAMPLE 2 | SAMPLE 3 | SAMPLE 4 |
| SAMPLE 3 | SAMPLE 4 | SAMPLE 1 |
| SAMPLE 4 | SAMPLE 1 | SAMPLE 2 |
| VALUE 1 | VALUE 2 | VALUE 3 |

INPUT SAMPLES (LOAD INSTRUCTIONS) — rows 1–4
CALCULATED VALUES (STORE INSTRUCTIONS) — row 5

FIG. 8

| INSTRUCTION STREAM ADDRESSES (PROGRAM COUNTER) | | INSTRUCTIONS |
|---|---|---|
| FROM MEMORY 54 | A − 76<br>A − 75 | PROCESSOR INSTRUCTION FETCHED FROM MEMORY<br>BRANCH TO SUBROUTINE AT TARGET A + 100 |
| FROM COPROCESSOR 14 | A + 100<br>A + 101<br>•••<br>A + 140 | PROCESSOR INSTRUCTIONS GENERATED BY COPROCESSOR AND EXECUTED BY PROCESSOR (E.G. TO LOAD/STORE DATA USED BY COPROCESSOR TO EXECUTE COPROCESSOR FUNCTION 2)<br>PROCESSOR INSTRUCTION (E.G. RETURN FROM SUBROUTINE) GENERATED BY COPROCESSOR AND EXECUTED BY PROCESSOR |
| FROM MEMORY 54 | A − 74<br>••• | INSTRUCTION FETCHED FROM MEMORY |

FIG. 9

| PROCESSOR 12 | COPROCESSOR 14 | |
|---|---|---|
| PROCESSOR INSTRUCTIONS EXECUTED BY PROCESSOR 12 | PROCESSOR INSTRUCTIONS GENERATED BY COPROCESSOR | COPROCESSOR OPERATIONS EXECUTED BY COPROCESSOR |
| INSTRUCTION FETCHED FROM MEMORY 54 { BRANCH TO SUBROUTINE AT A + 100 | | |
| LOAD SAMPLE 1 | LOAD SAMPLE 1 | NOP |
| LOAD SAMPLE 2 | LOAD SAMPLE 2 | MAC (SAMPLE 1, COEFFICIENT 1) |
| LOAD SAMPLE 3 | LOAD SAMPLE 3 | MAC (SAMPLE 2, COEFFICIENT 2) |
| LOAD SAMPLE 4 | LOAD SAMPLE 4 | MAC (SAMPLE 3, COEFFICIENT 3) |
| NOP OR STALL | NOP OR STALL | MAC (SAMPLE 4, COEFFICIENT 4) |
| STORE CALCULATED VALUE | STORE CALCULATED VALUE | ••• |
| ••• | | |
| RETURN FROM SUBROUTINE | RETURN FROM SUBROUTINE | |

US 7,925,862 B2

COPROCESSOR FORWARDING LOAD AND STORE INSTRUCTIONS WITH DISPLACEMENT TO MAIN PROCESSOR FOR CACHE COHERENT EXECUTION WHEN PROGRAM COUNTER VALUE FALLS WITHIN PREDETERMINED RANGES

RELATED APPLICATIONS

This is related to U.S. patent application Ser. No. 11/426,628, filed Jun. 27, 2006, assigned to the current assignee hereof, and entitled "METHOD AND APPARATUS FOR INTERFACING A PROCESSOR TO A COPROCESSOR". This is also related to U.S. patent application Ser. No. 11/426,633, filed Jun. 27, 2006, assigned to the current assignee hereof, and entitled "METHOD AND APPARATUS FOR INTERFACING A PROCESSOR TO A COPROCESSOR".

FIELD OF THE INVENTION

The present invention relates generally to interfacing, and more particularly to interfacing a processor and coprocessor.

RELATED ART

Coprocessors are often used to perform one or more specialized operations that can be off-loaded from a primary or general purpose processor. It is then very important to allow efficient communication and interfacing between the processor and coprocessor. In addition, in many systems, the processor utilizes one or more levels of cache to increase the efficiency of the system by reducing accesses to slower memory.

BRIEF DESCRIPTION OF THE DRAWINGS

The present invention is illustrated by way of example and is not limited by the accompanying figures, in which like references indicate similar elements, and in which:

FIG. 3 illustrates, in block diagram form, an instruction in accordance with one embodiment;

FIG. 4 illustrates, in block diagram form, an instruction in accordance with one embodiment;

FIG. 5 illustrates, in block diagram form, a portion of memory 54 of FIG. 1 in accordance with one embodiment;

FIG. 8 illustrates, in tabular form, a sample instruction stream in accordance with one embodiment; and FIG. 9 illustrates, in tabular form, how the instruction stream of FIG. 8 may be generated and executed by processor 12 and coprocessor 14 of FIG. 1 in accordance with one embodiment.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

Figure 1:
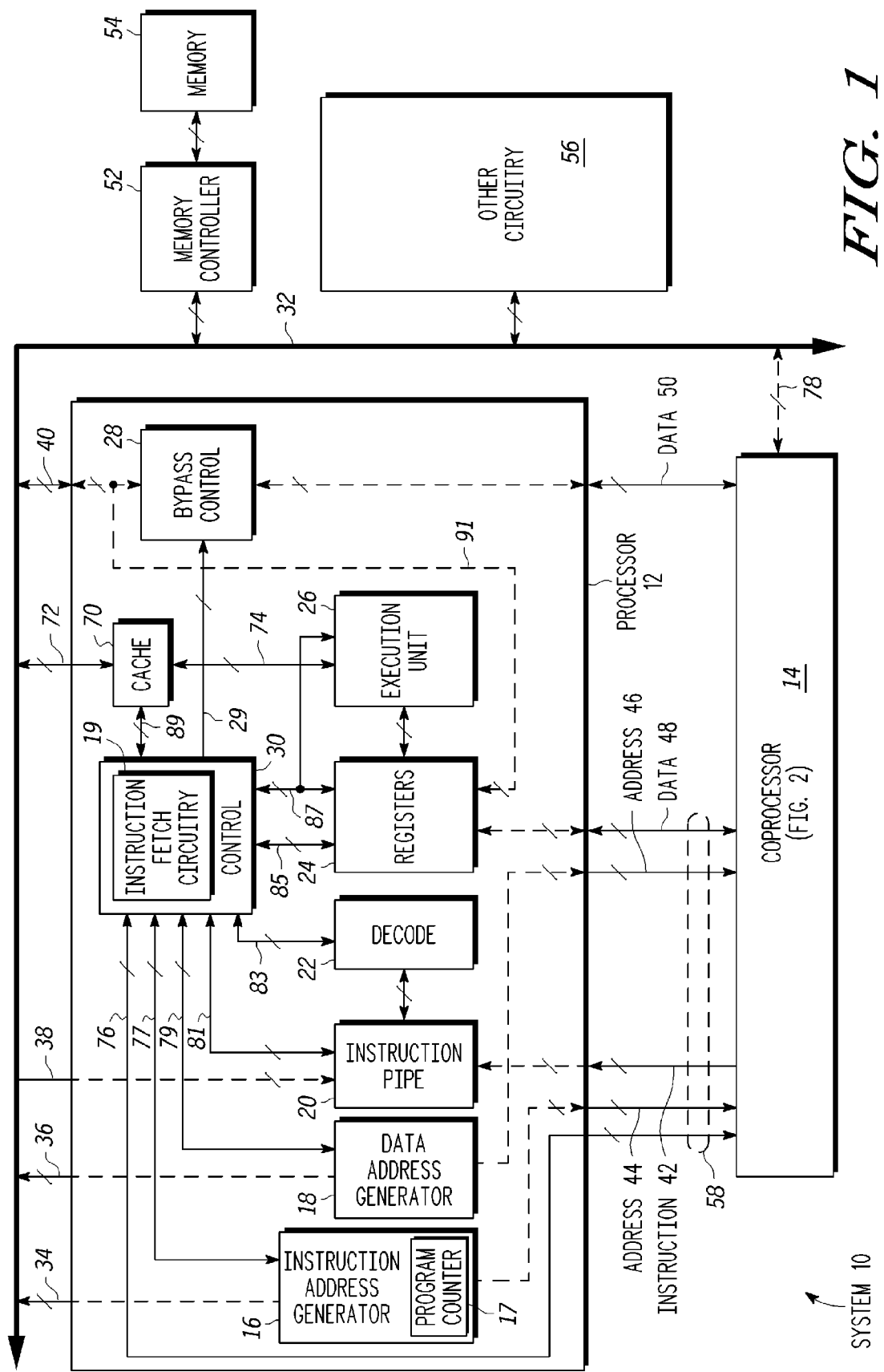
FIG. 1 illustrates, in block diagram form, a data processing system in accordance with one embodiment.

Referring to FIG. 1, it is important to maintain coherency in a system 10 between the information stored in memory 54, stored in cache 70, being used by the processor 12, and being used by the coprocessor 14. Note that by allowing the coprocessor 14 to insert processor instructions directly into the instruction decode path of processor 12, the coherency of cache 70 and memory 54 are ensured. Coherency of cache 70 and memory 54 are ensured because processor 12 treats the instructions inserted by coprocessor 14 in the same manner it would treat any other instruction, regardless of where they were fetched from (e.g. memory 54). Coprocessor 14 generates one or more instructions which are part of the standard instruction set of processor 12. Coprocessor 14 may generate these processor instructions in any desired manner. For example, one or more portions of a processor instruction may be determined using a state machine, combinational logic, or any other type of circuitry, while one or more portions may be determined using a look-up table. Any other method of generating instructions may be used by coprocessor 14. In addition, the instructions generated by coprocessor 14 may be any type of instructions.

In one embodiment, coprocessor 14 generates load and store instructions that are transferred to processor 12 for execution. Processor 12 thus performs the load and store instructions to memory 54 that are required to retrieve the data needed by coprocessor 14 to perform one or more selected coprocessor functions. Processor 12 may include bypass control circuitry 28 that is used by processor 12 during coprocessor initiated load instructions to transfer data directly to coprocessor 14 from memory 54, rather than storing the retrieved data in registers 24. Similarly, bypass control circuitry 28 may be used by processor 12 during coprocessor initiated store instructions to transfer data directly to memory 54 from coprocessor 14, rather than retrieving the data to be stored from registers 24. In one embodiment, the cache circuitry is not aware of when bypassing is taking place. The bypassing just allows a way for the data to be directed from/to the coprocessor 14 instead of from/to the processor registers 24. Note that in this embodiment, cache 70 operates in the same manner whether the load or store instruction was generated by coprocessor 14 or not. Thus coherency between cache 70, memory 54, processor 12, and coprocessor 14 is maintained with minimal cost in circuitry and processing time. However, alternate embodiments may not have bypassing or may handle bypassing in a different manner if it is desired to maintain cache coherency.

Referring to FIG. 1, in one embodiment, coprocessor 14 monitors the program counter value 17 of processor 12 by way of conductors 44 to determine when the program counter value 17 is within a predetermined address range. In one embodiment the program counter 17 of processor 12 is located in instruction address generator 16, while for alternate embodiments it may be located anywhere in processor 12. In one embodiment, coprocessor 14 uses a base address register 122 to store a base address which may be compared (e.g. by way of comparator 120) to selected bits of the program counter value 17 to determine if the program counter value 17 is within the predetermined range. In alternate embodiments, base address register 122 and comparator 120 may be located anywhere in system 10 (e.g. in processor 12) and a signal may be provided from the comparator 120 to coprocessor 14 to indicate when a match has occurred (i.e. the program counter value 17 is within the predetermined range).

If the program counter value 17 of processor 12 is not within the predetermined range, the coprocessor 14 does nothing but continue its monitoring of the program counter value 17. However, if the program counter value 17 of processor 12 is within the predetermined range, the coprocessor 14 uses the program counter value 17 to select one of a plurality of operations to be performed (see FIG. 7). Alternate embodiments may only have one operation to be performed by coprocessor 14, and thus may use the program counter value 17 as an enable rather than as an enable and selector.

Figures 6, 7:
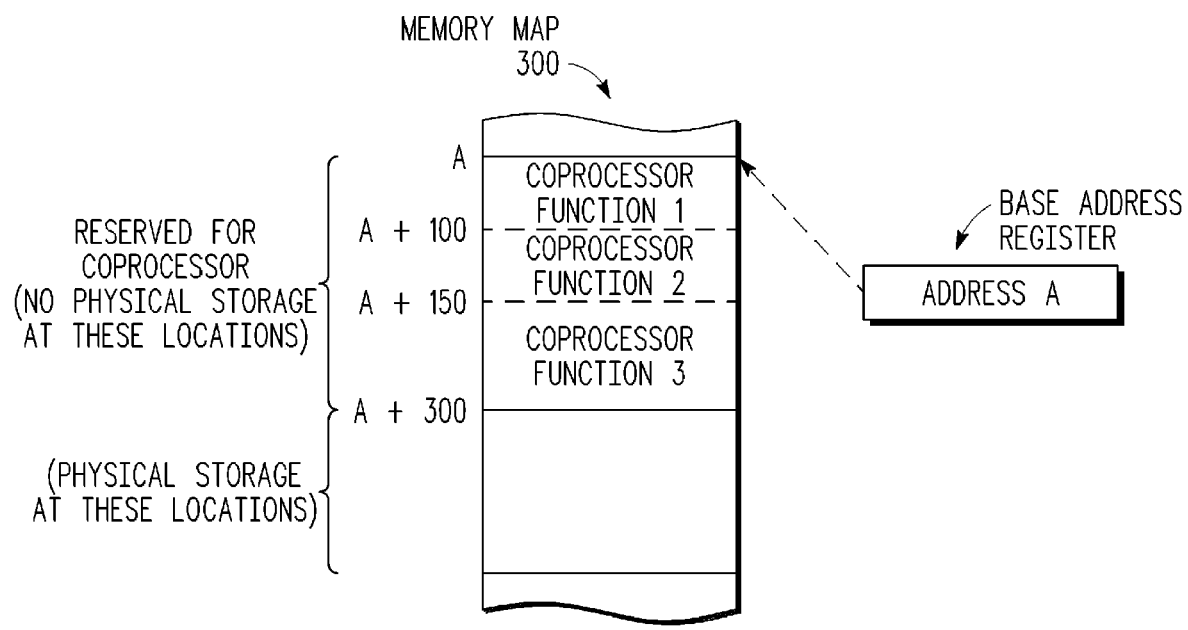
FIG. 6 illustrates, in tabular form, what address displacement 228 of FIG. 4 points to when accessing samples in circular buffer 55 of FIG. 5 in accordance with one embodiment.
FIG. 7 illustrates, in block diagram form, a memory map of system 10 of FIG. 1 in accordance with one embodiment.

Referring to FIG. 7, a program counter address 17 of "A" will cause coprocessor 14 to select coprocessor function 1; a program counter address 17 of "A+100" will cause coprocessor 14 to select coprocessor function 2; and a program counter address 17 of "A+150" will cause coprocessor 14 to select coprocessor function 3. Alternate embodiments may use any number of coprocessor functions. In addition, coprocessor functions (e.g. 1, 2, and 3) may be any function. Some common coprocessor functions that may be used are a filter function, a Verterbi algorithm, a fast Fourier transform, and a correlation function. However, other coprocessor functions may be used instead or in addition to these examples. Note that the address space from "A" to "A+300" in the system memory map is reserved for coprocessor 14 and has no corresponding physical storage circuitry (i.e. memory 54 and coprocessor 14 do not have storage circuitry that corresponds to the address space from "A" to "A+300"). In most prior art system, the next instruction is fetched from the address location pointed to by the program counter 17. This fetched instruction is then stored in instruction pipe 20 until it is to be executed by processor 12. Note that alternate embodiments may not have an instruction pipe 20, but may instead immediately execute a fetched instruction. Note that processor 12 uses the execution unit 26 and registers 24 to execute most instructions.

In the illustrated embodiment, when the program counter register 17 contains a value from "A" to "A+300", coprocessor 14 is enabled and uses the program counter value 17 to determine which coprocessor function is to be performed. Referring to FIG. 9, coprocessor 14 then performs the coprocessor function using function circuitry 102, e.g. by executing no operation (NOP) instructions and multiply accumulate (MAC) instructions. The coprocessor 14 also internally generates one or more instructions from the instruction set of processor 12 which are then transferred from coprocessor 14 to processor 12 (e.g. by way of instructions conductors 42). Note that the processor 12 instructions generated by coprocessor 14 are not stored at an instruction fetch address generated by processor 12, but instead are generated internally by coprocessor 14. Coprocessor 14 may generate these processor 12 instructions in any desired manner. For example, one or more portions of a processor 12 instruction may be determined using a state machine, combinational logic, or any other type of circuitry, while one or more portions may be determined using a look-up table. In the embodiment illustrated in FIG. 2, coprocessor 14 uses instruction generator 106 to generate the processor instructions to be transferred to processor 12 by way of conductors 42. Note that in one embodiment, the instructions generated and provided to processor 12 by coprocessor 14 are part of the standard instruction set of processor 12 and are not special instructions related to the processor/coprocessor interface.

By generating instructions for execution by processor 12, coprocessor 14 may utilize any of the processing capability of processor 12, and may direct a sequence of processor 12 operations to assist in performing a coprocessor algorithm. In this manner, coprocessor 14 may be simplified, since redundant coprocessor hardware may be eliminated, and instead, coprocessor 14 may direct the execution activity of processor 12 to support a desired coprocessing function. In many coprocessing operations, coherent data from memory 54 is required to implement the coprocessing function. In the illustrated embodiment, by generating standard processor 12 load and store instructions for execution by processor 12, data coherency is accomplished, since processor 12 is performing normal memory operand transfers on behalf of coprocessor 14. In addition, proper operation of memory management logic is assured, since these memory accesses appear to be identical to normal memory accesses generated by processor 12 when execution any other standard load or store instructions. Coprocessor 12 may also take advantage of any other processor 12 resource, such as a multiply unit, and divide unit, floating-point units, or any other resource which can be utilized by execution of a standard processor 12 instruction.

Figure 2:
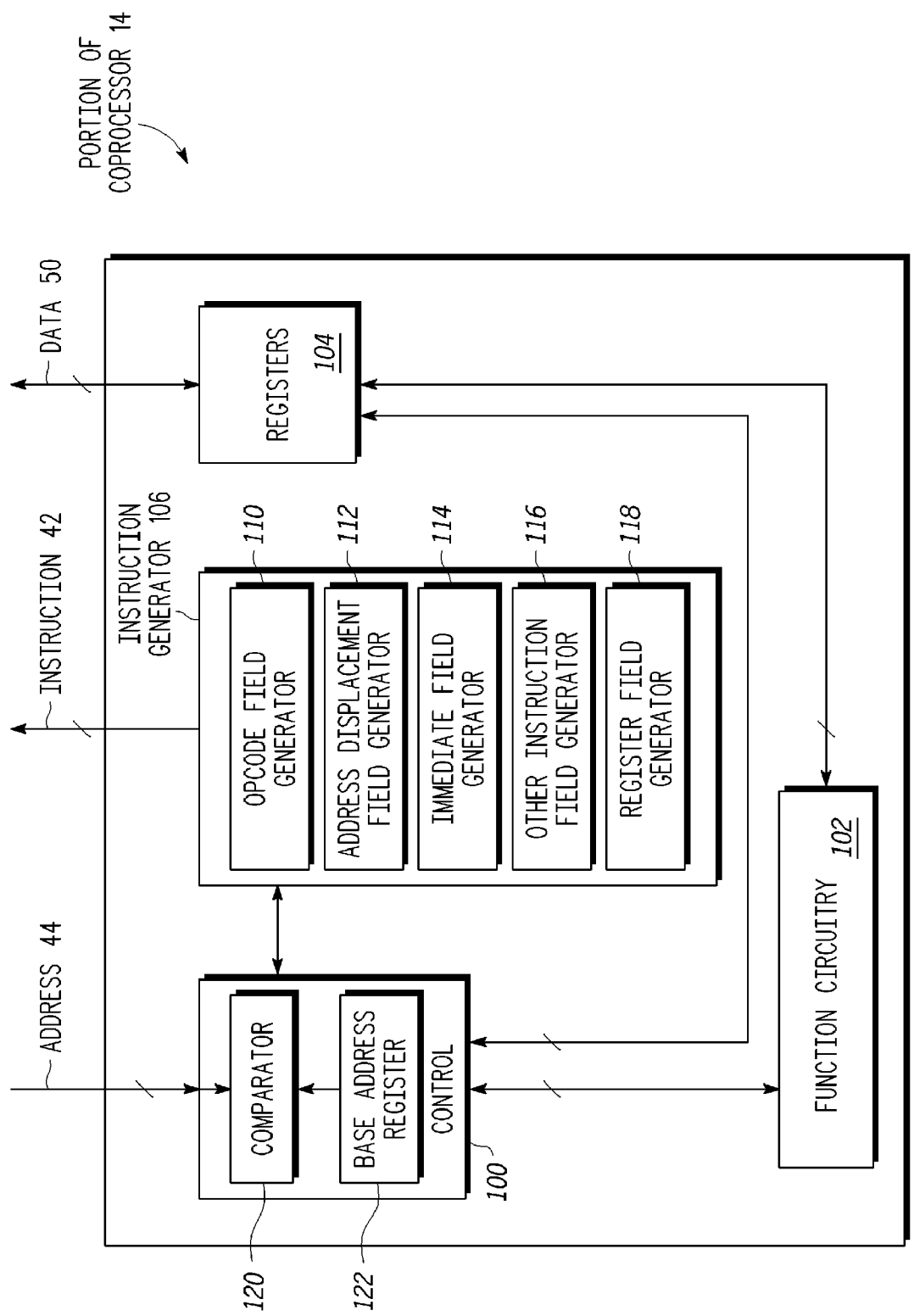
FIG. 2 illustrates, in block diagram form, a portion of coprocessor 14 of FIG. 1 in accordance with one embodiment.

Referring to FIGS. 2 and 3, in one embodiment, instruction generator 106 has an opcode field generator 110 for generating opcode field 202, an address displacement field generator 112 for generating one or more address displacement fields 208, an immediate field generator 114 for generating one or more immediate fields 210, other instruction field generator 118 for generating other fields 206, and register field generator 118 for generating register fields 204. Alternate embodiments may not implement generators 112, 114, 116, and 118 as the instructions fields 204, 206, 208, and 210 may be optional or not used for certain embodiments.

Referring to FIGS. 2-4, in one embodiment, instruction generator 106 generates load instructions, store instructions, and "return from subroutine" instructions for processor 12. For a "return from subroutine" instruction, opcode field generator 110 generates a return from subroutine opcode for opcode field 202, and circuitry 112, 114, 116, and 118 are not used because instruction fields 204, 206, 208, and 210 are not required. For a load or store instruction, opcode field generator 110 generates a load/store opcode 222, register fields generator 118 generates a source/destination register field 224 and a base address field 226, and address displacement field generator 114 generates an address displacement field 228. In the illustrated embodiment, for a load or store instruction, circuitry 114 and 116 are not used because instruction fields 206 and 210 are not required.

FIGS. 5 and 6 illustrate an example of the address values generated by address displacement fields generator 112 in coprocessor 14 when coprocessor 14 is used to perform an operation on data samples stored in a circular buffer in memory 54. FIG. 5 illustrates a portion of memory 54 which is used as a circular buffer 55 to store sample 1 at address location "B", to store sample 2 at address location "B+1", to store sample 3 at address location "B+2", and to store sample 4 at address location "B+3". Referring to FIG. 4, coprocessor 14 generates a load opcode for opcode field 222, generates address "B" as the base address register field 226, and generates "0" as the address displacement field 228. This load instruction is then transferred from coprocessor 14 and inserted into instruction pipe 20 by way of instruction conductors 42. Processor 12 then uses decode circuitry 22 to decodes this inserted load instruction. This inserted load instruction is then executed by processor 12.

The inserted load instruction causes processor 12 to access memory 54 to retrieve sample 1 at address location "B". The retrieved sample 1 is then either loaded in coprocessor 14 (e.g. in registers 104), or in both coprocessor 14 and in processor 12 (e.g. in registers 24). Note that the format for the inserted instruction is the same as the format for any other load instruction executed by processor 12. In the illustrated embodiment, except for the use of bypass control circuitry 28, it is transparent to processor 12 that the load instruction was inserted by coprocessor 14. The bypass control circuitry 28 may be used during the inserted load instruction to have the data retrieved from memory 54 loaded directly into coprocessor 14 instead of into processor registers 24. Coprocessor 14 may use a control signal (e.g. one of signals 76) to indicate to control 30 of processor 12 that bypass control circuitry 28 should be used to transfer retrieved data directly to coprocessor 14 in response to a processor 12 executing a load instruction. Control circuitry 30 may use one or more of control signals 29 to control bypass control circuitry 28.

Referring to FIG. 4, note that for one embodiment, the source/destination register field 224 of the inserted load/store instruction may not be used if the bypass control circuitry 28 transfers the load/store data directly to/from coprocessor 14 and bypasses processor 12. However, for alternate embodiments, the source/destination register field 224 of the inserted load/store instruction is still used if the bypass control circuitry 28 transfers the load/store data directly to/from coprocessor 14 while it is also transferred to/from processor 12.

Continuing with the example in FIGS. 5 and 6, coprocessor 14 generates a load opcode for opcode field 222, generates address "B" as the base address register field 226, and generates "1" as the address displacement field 228. This load instruction is then transferred from coprocessor 14 and inserted into instruction pipe 20 by way of instruction conductors 42. Processor 12 then uses decode circuitry 22 to decodes this inserted load instruction. This inserted load instruction is then executed by processor 12 and sample 2 is retrieved from memory 54 and loaded into registers 104.

Continuing with the example in FIGS. 5 and 6, coprocessor 14 generates a load opcode for opcode field 222, generates address "B" as the base address register field 226, and generates "2" as the address displacement field 228. This load instruction is then transferred from coprocessor 14 and inserted into instruction pipe 20 by way of instruction conductors 42. Processor 12 then uses decode circuitry 22 to decodes this inserted load instruction. This inserted load instruction is then executed by processor 12 and sample 3 is retrieved from memory 54 and loaded into registers 104.

Continuing with the example in FIGS. 5 and 6, coprocessor 14 generates a load opcode for opcode field 222, generates address "B" as the base address register field 226, and generates "3" as the address displacement field 228. This load instruction is then transferred from coprocessor 14 and inserted into instruction pipe 20 by way of instruction conductors 42. Processor 12 then uses decode circuitry 22 to decodes this inserted load instruction. This inserted load instruction is then executed by processor 12 and sample 4 is retrieved from memory 54 and loaded into registers 104.

Coprocessor 14 uses function circuitry 102 (see FIG. 2) to perform one or more operations on samples 1-4. The resulting calculated value is then stored in registers 104. Coprocessor 14 generates a store opcode for opcode field 222, generates address "C" as the base address register field 226, and generates "0" as the address displacement field 228. This store instruction is then transferred from coprocessor 14 and inserted into instruction pipe 20 by way of instruction conductors 42. Processor 12 then uses decode circuitry 22 to decode this inserted store instruction. This inserted store instruction is then executed by processor 12 and value 1 is retrieved from registers 104 using bypass control circuitry 28 and stored in memory 54. Alternate embodiments may have coprocessor 14 store the value 1 in a source register (e.g. one of registers 24) in processor 12 so that bypass control circuitry 28 is not needed. The first iteration for the coprocessor function operating on a set of input samples stored in the circular buffer has now been completed. The second iteration is performed in a similar manner, only the displacements in address displacement field 228 for the load instructions will be 1, 2, 3, and 0, and the displacement in address displacement field 228 for the store instruction will be 1. The third iteration is performed in a similar manner, only the displacements in address displacement field 228 for the load instructions will be 2, 3, 0, and 1, and the displacement in address displacement field 228 for the store instruction will be 2.

FIG. 8 illustrates, in tabular form, a sample instruction stream in accordance with one embodiment. In the illustrated embodiment, the contents of the program counter 17 are listed in the left column, and the corresponding instructions to be executed by processor 12 are listed in the right column. Note that in the illustrated sample instruction stream, the first two instructions are retrieved from memory 54 by processor 12. The next group of instructions are generated by coprocessor 14 (see circuitry 106 in FIG. 2) and are transferred directly into instruction pipe 20 by way of instruction conductors 42. The final group of instruction in the list are again retrieved from memory 54 by processor 12. Note that coprocessor 14 may be used to generate any desired type of instruction for processor 12 to execute.

In FIG. 8, a branch to subroutine instruction is fetched at program counter value A−75. This branch to subroutine instruction is used to "call" a particular coprocessor function, similar in effect to "calling" a software function. The target of this branch falls within the range of addresses utilized by coprocessor 14 to perform a specific function. Address A+100 corresponds to a desired coprocessor function, Function 2, and is used to signal to the coprocessor to begin the desired function. Processor 12 will continue to increment the program counter as standard processor 12 instructions are supplied by coprocessor 14 to processor 12 to support execution by the coprocessor of the desired Function 2. Once the desired function is complete, coprocessor 14 supplies a "return from subroutine" instruction when program counter value reaches A+140, indicating that the desired function is completed. Processor 12 then returns to the previous instruction stream at address A−74.

FIG. 9 illustrates, in tabular form, how the instruction stream of FIG. 8 may be generated and executed by processor 12 and coprocessor 14 of FIG. 1 in accordance with one embodiment. Alternate embodiments may generate and execute instruction streams in any desired manner. The example illustrated in FIG. 9 is meant merely to describe one possible alternative.

FIG. 9 illustrates the instructions being executed by processor 12 while the coprocessor 14 is concurrently doing two functions: generating future processor 12 instructions and performing a coprocessor operation. The left column illustrates the instructions being executed by processor 12. The arrows indicate the instructions that coprocessor 14 has generated and provided to processor 12 for processor 12 to execute. The middle column illustrates the instructions being generated by coprocessor 14 that are transferred to processor 12 for processor 12 to execute. The right column illustrates the coprocessor operations that are being performed concurrently by coprocessor 14. Thus, coprocessor 14 can generate instructions for processor 12 using instruction generator circuitry 106, while coprocessor 14 concurrently executes its own instructions or performs its own operations using function circuitry 102.

Note that by using coprocessor 14 to generate and insert standard instructions into instruction pipe 20 that are part of the instruction set of processor 12, the normal mechanisms used by processor 12 to maintain cache coherency for one or more caches 70 can still be used without any additional circuitry or complexity. Thus coprocessor 14 can insert instructions into the instruction pipe 20 of processor 12 in order to have processor 12 execute loads and stores to and from registers 104 in coprocessor 14. Because processor 12 is executing the load and store instructions generated by coprocessor 14 in the same manner as processor 12 would execute the load and store instructions retrieved from memory 54 (see FIG. 1), control circuitry 30 of processor 12 has no or little overhead to perform in order to maintain cache coherency.

DESCRIPTION OF FIGURES

FIG. 1 illustrates a data processing system 10 in accordance with one embodiment. In the illustrated embodiment, system 10 comprises a processor 12 which is bi-directionally coupled to a coprocessor 14 by way of conductors 58. In one embodiment, conductors 58 comprise instruction conductors 42, address conductors 44, control conductors 58, address conductors 46 and data conductors 48. In one embodiment, system 10 also includes memory controller 52 and other circuitry 56 which are bi-directionally coupled to bus 32. Memory controller 52 is bi-directionally coupled to one or memories, such as memory 54. Memory 54 may be any type of circuitry or storage medium that is capable of storing information. In alternate embodiments, memory controller 52 may be coupled to a plurality of memories which may be the same type of memory or may be different types of memory (e.g. non-volatile, dynamic random access memory, etc.). Coprocessor 14 is also bi-directionally coupled to bus 32 by way of conductors 78.

In one embodiment, processor 12 comprises instruction address generator 16, data address generator 18, instruction pipe 20, decode circuitry 22, a plurality of registers 24, execution unit 26, bypass control circuitry 28, control circuitry 30, and cache 70. Alternate embodiments may use more, less, or different portions of circuitry in processor 12. In one embodiment, control circuitry 30 is bi-directionally coupled to coprocessor 14 by way of conductors 76, is bi-directionally coupled to instruction address generator 16 by way of conductors 77, is bi-directionally coupled to data address generator 18 by way of conductors 79, is bi-directionally coupled to instruction pipe 20 by way of conductors 81, is bi-directionally coupled to decode circuitry 22 by way of conductors 83, is bi-directionally coupled to registers 24 by way of conductors 85, is bi-directionally coupled to registers 24 and execution unit 26 by way of conductors 87, is coupled to provide control signals to bypass control circuitry 28 by way of conductors 29, and is bi-directionally coupled to cache 70 by way of conductors 89.

In one embodiment, coprocessor 14 is bi-directionally coupled to instruction address generator 16 by way of address conductors 44, is bi-directionally coupled to instruction pipe 20 by way of instruction conductors 42, is bi-directionally coupled to data address generator 18 by way of address conductors 46, is bi-directionally coupled to registers 24 by way of data conductors 48, and is bi-directionally coupled to bypass control circuitry 28 by way of data conductors 50. In one embodiment, bypass control circuitry 28 is bi-directionally coupled to registers 24 by way of conductors 91. In one embodiment, data address generator 18 is bi-directionally coupled to bus 32 by way of conductors 36, and instruction pipe 20 is bi-directionally coupled to bus 32 by way of conductors 38. In one embodiment, cache 70 is bi-directionally coupled to execution unit 26 by way of conductors 74. In one embodiment, instruction address generator 16 comprises a program counter 17. In one embodiment, the program counter 17 is a register that points to the currently executing instruction. In one embodiment, control circuitry 30 comprises instruction fetch circuitry 19.

Alternate embodiments of system 10 may use different blocks or portions of circuitry to implement processor 12. The embodiment of processor 12 illustrated in FIG. 1 is just one of many possible embodiments of processor 12. For example, alternate embodiments of processor 12 may have no cache or multiple levels of cache, may have no instruction pipe or an instruction pipe of any desired depth, may have a plurality of execution units (e.g. 26), etc. In addition, the architecture of processor 12 may be arranged in any desired manner. Other circuitry 56 may include any conceivable desired circuitry. Memory controller 52 may be any type of circuitry. In one embodiment memory controller 52 may comprises DMA (direct memory access) circuitry. In one embodiment, the circuitry illustrated in FIG. 1 may be formed on a single integrated circuit. In alternate embodiments, the circuitry illustrated in FIG. 1 may be formed on a plurality of integrated circuits. System 10 may be used for any desired applications.

FIG. 2 illustrates one embodiment of a portion of coprocessor 14 of FIG. 1. In the embodiment illustrated in FIG. 2, coprocessor 14 comprises control circuitry 100, function circuitry 102, registers 104, and instruction generator 106. In one embodiment, control circuitry 100 comprises a comparator 120 coupled to receive a first address value from address signals 44 and coupled to receive a second address value from base address register 122. Comparator 120 compares these two received address values and determines if they match. Control circuitry 100 is bi-directionally coupled to function circuitry 102, is bi-directionally coupled to registers 104, and is bi-directionally coupled to instruction generator 106. In one embodiment, instruction generator 106 comprises an opcode field generator 110, an address displacement field generator 112, an immediate field generator 114, an other instructions field generator 116, and a register field generator 118. Note that circuitry 110, 112, 114, 116, and 118 in instruction generator circuitry 106 may be used to generate the corresponding fields in instruction 200 of FIG. 3.

Still referring to FIG. 2, instruction generator 106 is coupled to instruction conductors 42 for providing one or more instructions. Registers 104 are coupled to data conductors 50 to receive or provide data. Registers 104 are also bi-directionally coupled to function circuitry 102. Alternate embodiments of coprocessor 14 may use different blocks or portions of circuitry to implement various portions of coprocessor 14. The embodiment of coprocessor 14 illustrated in FIG. 2 is just one of many possible embodiments of coprocessor 14. For example, function circuitry 102 may be implemented to perform any type and any number of desired functions.

FIG. 3 illustrates one embodiment of an instruction 200 that may be generated by coprocessor 14 (see instruction generator 106 in FIG. 2). The embodiment of the instruction 200 illustrated in FIG. 3 comprises an opcode field 202 that identifies the instruction, one or more register fields 204 (that may or may not be implemented in alternate embodiments) which indicate one or more registers as being involved in the instruction, one or more other fields 206 (that may or may not be implemented in alternate embodiments) and that may have any desired function, one or more address displacement fields 208 (that may or may not be implemented in alternate embodiments) for indicating address displacement, and one or more immediate fields 210 (that may or may not be implemented in alternate embodiments) for providing immediate values as part of the instruction. Alternate embodiments may use any desired number and combination of these fields or any desired additional fields (not shown).

FIG. 4 illustrates one embodiment of an instruction 220 that may be generated by some embodiments of coprocessor 14. The embodiment of the instruction 220 illustrated in FIG. 4 comprises a load/store opcode field 222 that identifies the instruction as either a load instruction or a store instruction, a source/destination register field 224 which specifies the destination register for a load instruction or the source register for a store instruction, a base address register field 226 that provides the base address for the memory access, and an address displacement field 228 for providing the address displacement for the memory access (e.g. see memory 54 in FIG. 1). Alternate embodiments may use any desired number and combination of these fields.

FIG. 5 illustrates one embodiment of a portion of memory 54 of FIG. 1 that has been used to implement a circular buffer 55.

FIG. 6 illustrates, in tabular form, what address displacement field 228 of FIG. 4 points to when accessing samples in circular buffer 55 of FIG. 5 in accordance with one embodiment. In the illustrated embodiment, samples 1-4 represent input data that has been stored in address locations B through B+3, respectively, in memory 54 of FIG. 1. A plurality of load instructions, such as the load instruction 220 illustrated in FIG. 4, may be generated by coprocessor 14 and inserted into instruction pipe 20 of processor 12 (see FIG. 2). Processor 12 may then execute the load instructions 220 generated by coprocessor 14. The load instructions 220 executed by processor 12 may load registers in processor 12 and/or in coprocessor 14 (e.g. registers 104 in FIG. 2). The function circuitry 102 of coprocessor 14 (see FIG. 2) may then be used to perform one or more computations or operations on the input data.

Still referring to FIG. 6, once a result value or values is determined by coprocessor 14, coprocessor 14 may use instruction generator circuitry 106 (see FIG. 2) to generate one or more store instructions 220. These store instructions 220 can be provided to the instruction pipe of processor 12 by way of instruction conductors 42. Processor 12 may then execute the store instructions 220 generated by coprocessor 14. The store instructions 220 executed by processor 12 may transfer values 1-3 to memory 54 (see FIG. 1) from registers in processor 12 and/or from registers in coprocessor 14 (e.g. registers 104 in FIG. 2). Locations C through C+2 in memory 54 will then store the resulting values 1-3.

FIGS. 7-9 have been described herein above.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Additional statements to support SC14981TH.

1. A method for interfacing a coprocessor to a processor, the processor decoding and executing a first instruction set, comprising:
   the coprocessor generating at least one instruction of the first instruction set; and
   the coprocessor providing the generated at least one instruction of the first instruction set to the processor for decoding and executing.

2. The method of statement 1, further comprising:
   the processor decoding and executing the generated at least one instruction.

3. The method of statement 1, wherein the coprocessor generating the at least one instruction of the first instruction set comprises:
   selecting an opcode from a plurality of opcodes defined within the first instruction set, and
   providing the selected opcode as at least a portion of the generated at least one instruction.

4. The method of statement 3, wherein the coprocessor generating the at least one instruction of the first instruction set comprises:
   calculating at least one operand field corresponding to the selected opcode; and
   providing the selected opcode and the calculated operand field as at least a portion of the generated at least one instruction.

5. The method of statement 4, wherein calculating the at least one operand field comprises calculating an address displacement field.

6. The method of statement 4, wherein calculating the at least one operand field comprises calculating an immediate field.

7. The method of statement 4, wherein calculating the at least one operand field comprises calculating a register field.

8. The method of statement 1, wherein the coprocessor generating the at least one instruction is performed at runtime.

9. The method of statement 1, wherein the generated at least one instruction is not stored at an instruction fetch address generated by the processor.

10. The method of statement 1, wherein the coprocessor waits a predetermined amount of time prior to providing the generated at least one instruction to the processor.

11. The method of statement 1, wherein the coprocessor generating the at least one instruction comprises:
    the coprocessor providing a plurality of instructions, each of the plurality of instructions within the first instruction set, wherein a sequence of the instructions in the plurality of instructions is determined at runtime by the coprocessor.

12. The method of statement 11, wherein the coprocessor selects each instruction of the plurality of instructions from a list of instructions.

13. A method for interfacing a coprocessor to a processor, the processor decoding and executing a first instruction set, the first instruction set including a store instruction and a load instruction, comprising:
    the coprocessor selecting an opcode corresponding to the store instruction or the load instruction;
    the coprocessor calculating an address displacement corresponding to the selected opcode;

the coprocessor providing the selected opcode and the calculated address displacement as a generated instruction to the processor; and the processor decoding and executing the generated instruction.

14. The method of statement 13, wherein the selected opcode corresponds to the load instruction, the method further comprising:

in response to the processor executing the generated instruction, the coprocessor receiving a data value; and the coprocessor using the data value to perform a coprocessor function.

15. The method of statement 14, wherein the selected opcode corresponds to the store instruction, the method further comprising:

the coprocessor performing a coprocessor function and obtaining a result value; and the coprocessor providing the result value to be stored at a location indicated by the generated instruction.

16. The method of statement 13, wherein the generated instruction is not stored at an instruction fetch address generated by the processor.

17. The method of statement 13, further comprising:

the coprocessor selecting a second opcode corresponding to the store instruction or the load instruction;

the coprocessor calculating a second address displacement corresponding to the selected second opcode;

the coprocessor providing the selected second opcode and the calculated second address displacement as a second generated instruction to the processor; and the processor decoding and executing the second generated instruction, the second generated instruction not being stored at an instruction fetch address generated by the processor.

18. A data processing system comprising:

a processor having decode and execution circuitry for decoding and executing instructions of an instruction set and having instruction fetch circuitry for generating fetch addresses; and a coprocessor, coupled to the processor, having instruction generation circuitry for generating at least one instruction of the instruction set;

wherein, in a first mode of operation, the processor decodes and executes instructions of the instruction set which are stored at the fetch addresses generated by the processor, and in a second mode of operation, the processor decodes and executes instructions of the instruction set which are generated by the instruction generation circuitry of the coprocessor.

19. The data processing system of statement 18, wherein the instructions of the instruction set which are generated by the instruction generation circuitry of the coprocessor are not stored at fetch addresses generated by the processor.

20. The data processing system of statement 19, wherein the instructions of the instruction set which are generated by the instruction generation circuitry are provided in response to fetch addresses generated by the instruction fetch circuitry of the processor.

Additional statements to support SC14982TH.

1. A method for implementing a filter by a coprocessor for a processor, comprising:

the coprocessor generating a plurality of load instructions for loading a plurality of input samples;

providing the generated plurality of load instructions to the processor;

the processor decoding and executing the generated plurality of load instructions;

in response to the processor decoding and executing the generated plurality of load instructions, the coprocessor receiving the plurality of input samples; and the coprocessor performing a filtering operation using the plurality of input samples.

2. The method of statement 1, wherein the processor decodes and executes an instruction set, and wherein each of the generated plurality of load instructions is within the instruction set.

3. The method of statement 1, wherein the generated plurality of load instructions are not stored at fetch addresses generated by the processor.

4. The method of statement 1, further comprising:

in response to performing the filtering operation using the plurality of input samples, the coprocessor obtaining a calculated value;

the coprocessor generating a store instruction;

the coprocessor providing the generated store instruction to the processor; and the processor decoding and executing the generated store instruction to store the calculated value.

5. The method of statement 4, wherein the generated store instruction is not stored at a fetch address generated by the processor.

6. The method of statement 4, wherein the processor decodes and executes an instruction set, and wherein the generated store instruction is within the instruction set.

7. The method of statement 1, wherein the coprocessor generating the plurality of load instructions comprises:

calculating an address displacement field for each of the plurality of load instructions.

8. The method of statement 7, wherein calculating the address displacement field for each of the plurality of load instructions is performed based on at least one filter characteristic.

9. The method of statement 8, wherein the at least one filter characteristic is selected from a group consisting of filtering operation type, filter length, number of input/output samples, and number of taps.

10. The method of statement 1, wherein the coprocessor dynamically determines the plurality of load instructions to be generated based on the filtering operation.

11. The method of statement 1, further comprising:

the coprocessor generating a second plurality of load instructions for loading a plurality of filter coefficients;

providing the generated second plurality of load instructions to the processor;

the processor decoding and executing the generated second plurality of load instructions;

in response to the processor decoding and executing the generated second plurality of load instructions, the coprocessor receiving the plurality of filter coefficients; and the coprocessor performing the filtering operation using the plurality of input samples and the plurality of filter coefficients.

12. The method of statement 1, wherein the filter implemented by the coprocessor comprises an FIR filter.

13. A method for implementing a filter by a coprocessor for a processor, comprising:

determining at least one characteristic of the filter, the at least one characteristic of the filter selected from a group consisting of type of filter, length of the filter, and current state of the filter;

the coprocessor generating a sequence of instructions based on the at least one characteristic of the filter, wherein generating the sequence of instructions comprises using the at least one characteristic of the filter to calculate an address displacement field of each instruction in the sequence of instructions;
the coprocessor providing the generated sequence of instructions to the processor; and
the processor decoding and executing the generated sequence of instructions.

14. The method of statement 13, wherein the generated sequence of instructions includes at least one generated load instruction, wherein, in response to the processor decoding and executing the generated load instruction, the coprocessor receiving an input sample.

15. The method of statement 14, further comprising:
the coprocessor using the input sample to perform a filter operation.

16. The method of statement 14, wherein the generated sequence of instructions includes at least one generated store instruction, wherein, in response to the processor decoding and executing the generated store instruction, an output value calculated by the coprocessor is stored.

17. The method of statement 13, further comprising:
the coprocessor performing a filter operation to obtain a calculated value; and
wherein the generated sequence of instructions includes at least one generated store instruction, wherein the processor decodes and executes the generated store instruction to store the calculated value provided by the coprocessor.

18. The method of statement 13, wherein generating the sequence of instructions comprises using a plurality of filter characteristics of the filter to calculate the address displacement field of each instruction in the sequence of instructions.

19. A data processing system, comprising:
a coprocessor for implementing a filter for a processor, the coprocessor comprising:
an instruction generator for generating a plurality of load instructions for loading a plurality of input samples, for generating a plurality of store instructions for storing a plurality of calculated values, and for providing the generated plurality of load instructions and the generated plurality of store instructions to the processor, the instruction generator comprising an address displacement field generator for calculating an address displacement for each of the generated plurality of load instructions and for each of the generated plurality of store instructions; and
function circuitry for performing a filter operation using the plurality of input samples to obtain the plurality of calculated values; and
a processor, coupled to the coprocessor, the processor comprising decode and execution circuitry for decoding and executing the generated plurality of load instructions to provide the input samples to the coprocessor and for decoding and executing the generated plurality of store instructions to store the plurality of calculated values.

20. The data processing system of statement 19, wherein the generated plurality of load instructions and the generated plurality of store instructions are not stored at fetch addresses generated by the processor.

Additional statements to support SC14983TH.

1. A method for interfacing a processor to a coprocessor, the coprocessor capable of performing a plurality of coprocessor operations, comprising:
the processor performing an instruction fetch from a target address;
in response to the processor performing the instruction fetch from the target address, the coprocessor initiating one of the plurality of coprocessor operations, wherein the one of plurality of coprocessor operations is selected based on at least a portion of the target address.

2. The method of statement 1, further comprising:
prior to the processor performing the instruction fetch from the target address, the processor decoding an instruction which results in a change of flow to the target address.

3. The method of statement 2, wherein the instruction which results in a change of flow to the target address is a branch instruction.

4. The method of statement 2, wherein the instruction which results in a change of flow to the target address is a branch to subroutine instruction.

5. The method of statement 4, further comprising:
the coprocessor, after initiating the one of the plurality of coprocessor operations completing the one of the plurality of coprocessor operations;
providing to the processor a return from subroutine instruction; and
the processor decoding and executing the return from subroutine instruction.

6. The method of statement 1, further comprising:
the coprocessor providing a first instruction to the processor in response to the instruction fetch from the target address; and
the processor executing and decoding the first instruction.

7. The method of statement 6, further comprising:
the processor performing a second instruction fetch from a second instruction address following the target address;
in response to the second instruction fetch from the second instruction address, the coprocessor providing a second instruction to the processor; and
the processor executing and decoding the second instruction.

8. The method of statement 7, wherein the second instruction comprises a change of flow instruction.

9. The method of statement 8, wherein the second instruction results in a change of flow to an address following the first instruction address.

10. The method of statement 1, wherein each of the plurality of coprocessor operations corresponds to at least one instruction address, the at least one instruction address not accessing a physical memory array location.

11. A method for interfacing a processor to a coprocessor, the coprocessor capable of performing a plurality of coprocessor operations, the method comprising:
the processor fetching a plurality of instructions from a memory;
the processor executing the plurality of instructions wherein a first instruction of the plurality of instructions comprises a branch instruction having a target address;
the processor performing an instruction fetch from the target address;
in response to the processor performing the instruction fetch from the target address, the coprocessor providing at least one instruction to the processor; and
the processor decoding and executing the at least one instruction.

12. The method of statement 11, further comprising:
using the target address to select one of a plurality of coprocessor operations, wherein the at least one instruction provided by the coprocessor to the processor comprises instructions to load or store data used in performing the selected coprocessor operation.

13. The method of statement 11, wherein the branch instruction comprises a branch to subroutine instruction, and the at least one instruction provided by the coprocessor to the processor comprises a return from subroutine instruction.

14. The method of statement 11, wherein the coprocessor providing the at least one instruction to the processor is performed such that each instruction of the at least one instruction is provided to the processor in response to an instruction fetch address generated by the processor.

15. The method of statement 14, wherein the instruction fetch addresses fall within a predetermined range of addresses, the method further comprising:
the coprocessor selecting one of the plurality of coprocessor operations based on where the target instruction falls within the predetermined range of addresses.

16. The method of statement 15, wherein the at least one instruction provided by the coprocessor to the processor comprises a change of flow instruction to a second target address, the second target address located outside the predetermined range of addresses.

17. The method of statement 15, wherein the predetermined range of addresses do not correspond to any physical storage locations.

18. A data processing system comprising:
a processor having decode and execution circuitry for decoding and executing instructions of an instruction set and having instruction fetch circuitry for generating fetch addresses; and
a coprocessor, coupled to the processor, having instruction generation circuitry for generating an instruction of the instruction set and providing the generated instruction to the processor when the fetch addresses falls within a predetermined range of addresses.

19. The data processing system of statement 18, wherein the coprocessor further comprises:
function circuitry for performing at least one coprocessor operation, the coprocessor initiating the at least one coprocessor operation when a fetch address generated by the instruction etch circuitry falls within the predetermined range of addresses, the coprocessor selecting the at least one coprocessor operation based on where the fetch address falls within the predetermined address range.

20. The data processing system of statement 18, further comprising:
a base register address for storing a base address of the predetermined range of addresses; and
a comparator for comparing fetch addresses to the base address.

21. The data processing system of statement 18, wherein the predetermined address range does not correspond to any physical storage locations.

The invention claimed is:

1. A method for implementing a plurality of operations by a coprocessor for a processor, comprising:
transferring a program counter value of the processor to the coprocessor;
the coprocessor generating a plurality of load instructions for loading a plurality of input samples, wherein each of the plurality of load instructions includes at least an opcode field, and wherein the coprocessor generates the plurality of load instructions in response to the program counter value of the processor being within a predetermined range, and wherein the coprocessor generating the plurality of load instructions comprises calculating an address displacement field for each of the plurality of load instructions;
the coprocessor transferring the generated plurality of load instructions to the processor;
the processor decoding and executing the generated plurality of load instructions;
in response to the processor decoding and executing the generated plurality of load instructions, the coprocessor receiving the plurality of input samples; and
the coprocessor performing the plurality of operations using the plurality of input samples.

2. The method of claim 1, wherein the processor decodes and executes an instruction set, and wherein each of the generated plurality of load instructions is within the instruction set.

3. The method of claim 1, wherein the generated plurality of load instructions are not stored at fetch addresses generated by the processor.

4. The method of claim 1, further comprising:
in response to performing the plurality of operations using the plurality of input samples, the coprocessor obtaining a calculated value;
the coprocessor generating a store instruction;
the coprocessor providing the generated store instruction to the processor; and
the processor decoding and executing the generated store instruction to store the calculated value.

5. The method of claim 4, wherein the generated store instruction is not stored at a fetch address generated by the processor.

6. The method of claim 4, wherein the processor decodes and executes an instruction set, and wherein the generated store instruction is within the instruction set.

7. The method of claim 1, wherein the coprocessor uses the program counter value to select one of a plurality of coprocessor operations.

8. The method of claim 1, further comprising:
the coprocessor generating a return from subroutine instruction;
transferring the generated return from subroutine instruction to the processor; and
the processor decoding and executing the generated return from subroutine instruction.

9. The method of claim 1, further comprising:
the coprocessor generating a no operation instruction;
transferring the generated no operation instruction to the processor; and
the processor decoding and executing the generated no operation instruction.

10. The method of claim 1, wherein the coprocessor performs one of the plurality of operations while also concurrently generating the no operation instruction.

11. A data processing system, comprising:
a coprocessor for implementing a plurality of operations for a processor, the coprocessor comprising:
an instruction generator for generating a plurality of load instructions in response to a program counter value being within a first predetermined range, the plurality of load instructions for loading a plurality of input samples, wherein each of the plurality of load instructions includes at least an opcode field, the instruction generator for generating a plurality of store instructions in response to the program counter value being within a second predetermined range, the plurality of store instructions for storing a plurality of calculated values, and for providing the generated plurality of load instructions and the generated plurality of store instructions to the processor, the instruction generator comprising an address displacement field generator for calculating an address displacement for each of the generated plurality of load instructions and for each of the generated plurality of store instructions, and function circuitry for performing the plurality of operations using the plurality of input samples to obtain the plurality of calculated values; and a processor, coupled to the coprocessor, the processor comprising decode and execution circuitry for decoding and executing the generated plurality of load instructions to provide the input samples to the coprocessor and for decoding and executing the generated plurality of store instructions to store the plurality of calculated values.

12. The data processing system of claim 11, wherein the generated plurality of load instructions and the generated plurality of store instructions are not stored at fetch addresses generated by the processor.

13. The data processing system of claim 11, wherein the function circuitry performs the plurality of operations during a filter operation.

14. The data processing system of claim 11, further comprising:

conductors coupled to the processor and to the coprocessor, wherein the conductors transfer the program counter value of the processor from the processor to the coprocessor.

15. A data processing system, comprising:

a coprocessor for implementing a plurality of multiply and accumulate operations for a processor, the coprocessor comprising:

an instruction generator for generating a plurality of load instructions in response to a program counter value being within a first predetermined range, the plurality of load instructions for loading a plurality of input samples, wherein each of the plurality of load instructions includes at least an opcode field, the instruction generator for generating a plurality of store instructions in response to the program counter value being within a second predetermined range, the plurality of store instructions for storing a plurality of calculated values, and for providing the generated plurality of load instructions and the generated plurality of store instructions to the processor, the instruction generator comprising an address displacement field generator for calculating an address displacement for each of the generated plurality of load instructions and for each of the generated plurality of store instructions, wherein the generated plurality of load instructions and the generated plurality of store instructions are not stored at fetch addresses generated by the processor, and function circuitry for performing the plurality of multiply and accumulate operations using the plurality of input samples to obtain the plurality of calculated values, wherein the function circuitry performs the plurality of multiply and accumulate operations during a filter operation; and a processor, coupled to the coprocessor, the processor comprising decode and execution circuitry for decoding and executing the generated plurality of load instructions to provide the input samples to the coprocessor and for decoding and executing the generated plurality of store instructions to store the plurality of calculated values.

* * * * *